United States Patent
Sweeney

(10) Patent No.: US 7,429,984 B2
(45) Date of Patent: Sep. 30, 2008

(54) DISPLAY MANAGEMENT SYSTEM

(75) Inventor: William R. Sweeney, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 658 days.

(21) Appl. No.: 11/051,723

(22) Filed: Feb. 4, 2005

(65) Prior Publication Data

US 2006/0176239 A1   Aug. 10, 2006

(51) Int. Cl.
*G09G 5/00* (2006.01)

(52) U.S. Cl. .................. 345/211; 345/87; 345/211; 345/212; 902/26

(58) Field of Classification Search ............. 345/84, 345/85, 86, 87, 105, 106, 107, 211, 212; 902/26
See application file for complete search history.

(56) References Cited

U.S. PATENT DOCUMENTS

| | | | |
|---|---|---|---|
| 4,002,886 A | 1/1977 | Sundelin | |
| 4,099,247 A * | 7/1978 | Mikada et al. | 708/160 |
| 4,339,668 A | 7/1982 | Mueller et al. | |
| 4,390,877 A | 6/1983 | Curran | |
| 4,766,295 A | 8/1988 | Davis et al. | |
| 4,841,429 A | 6/1989 | McClanahan et al. | |
| 4,888,709 A | 12/1989 | Revesz et al. | |
| 4,942,352 A | 7/1990 | Sano | |
| 5,111,196 A | 5/1992 | Hunt | |
| 5,181,131 A * | 1/1993 | Yamazaki et al. | 345/87 |
| 5,198,644 A | 3/1993 | Pfeiffer et al. | |
| 5,455,466 A | 10/1995 | Parks et al. | |
| 5,510,602 A | 4/1996 | Evans et al. | |
| 5,537,126 A | 7/1996 | Kayser et al. | |
| 5,554,041 A | 9/1996 | Lallement | |
| 5,583,525 A | 12/1996 | Nekomoto et al. | |
| 5,734,254 A | 3/1998 | Stephens | |
| 5,850,416 A * | 12/1998 | Myer | 375/221 |
| 5,870,067 A | 2/1999 | Smith | |
| 5,963,144 A | 10/1999 | Kruest | |
| 5,982,304 A | 11/1999 | Selker et al. | |
| 6,040,680 A | 3/2000 | Toya et al. | |
| 6,057,668 A | 5/2000 | Chao | |
| 6,097,301 A | 8/2000 | Tuttle | |

(Continued)

FOREIGN PATENT DOCUMENTS

AU    199923699 A1    10/2000

(Continued)

OTHER PUBLICATIONS

Michael Kleper et al., "Advanced Display Technologies", An Investigation of the Emerging and Developing Technologies Related to the Generation Beyond Print-on-Paper, pp. 1-24, Rochester Institute of Technology, No. PICRM-2003-07, Oct. 2003.

*Primary Examiner*—My-Chau T Tran
(74) *Attorney, Agent, or Firm*—Buchanan Ingersoll & Rooney PC

(57) ABSTRACT

Systems and methods for providing personalized information are provided. Based on an identification of a customer and/or a product, the personalized information is produced and wirelessly provided to a display such as a wireless display. A wireless information reader is used to gather the identification and the personalized information and transmit power and data to the display.

20 Claims, 1 Drawing Sheet

U.S. PATENT DOCUMENTS

Figure 1:
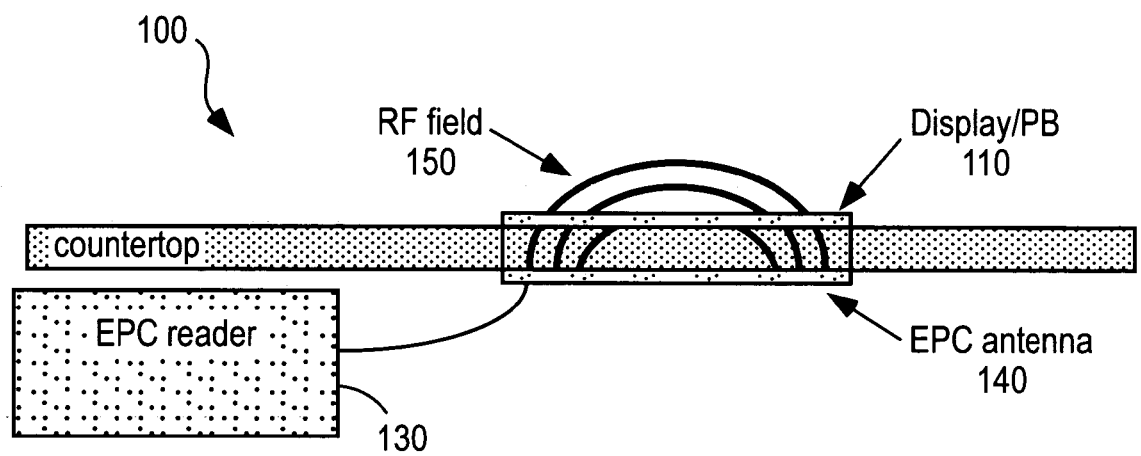

| | | |
|---|---|---|
| 6,118,426 A | 9/2000 | Albert et al. |
| 6,154,005 A | 11/2000 | Hyogo et al. |
| 6,172,608 B1 | 1/2001 | Cole |
| 6,401,074 B1 | 6/2002 | Sleeper |
| 6,422,464 B1 | 7/2002 | Terranova |
| 6,550,672 B1 | 4/2003 | Tracy et al. |
| 6,714,133 B2 * | 3/2004 | Hum et al. ............... 340/573.4 |
| 6,726,099 B2 | 4/2004 | Becker et al. |
| 6,760,017 B1 | 7/2004 | Banerjee et al. |
| 6,760,804 B1 | 7/2004 | Hunt et al. |
| 7,270,276 B2 * | 9/2007 | Vayssiere .................... 235/492 |
| 7,283,036 B2 * | 10/2007 | Chen ...................... 340/10.34 |
| 2001/0043141 A1 | 11/2001 | Tuttle |
| 2001/0046126 A1 | 11/2001 | Colello |
| 2002/0097143 A1 | 7/2002 | Dalglish |
| 2002/0140546 A1 | 10/2002 | Tuttle |
| 2002/0174025 A1 | 11/2002 | Hind et al. |
| 2003/0009392 A1 | 1/2003 | Perkowski |
| 2003/0018541 A1 | 1/2003 | Nohr |
| 2003/0078840 A1 | 4/2003 | Strunk et al. |
| 2003/0097302 A1 | 5/2003 | Overhultz et al. |
| 2003/0115096 A1 | 6/2003 | Reynolds et al. |
| 2003/0122655 A1 * | 7/2003 | Hum et al. ................. 340/10.3 |
| 2003/0132301 A1 | 7/2003 | Selker |
| 2003/0227384 A1 | 12/2003 | Sweeney et al. |
| 2003/0233288 A1 | 12/2003 | Sweeney et al. |
| 2004/0002897 A1 | 1/2004 | Vishik |
| 2004/0100359 A1 | 5/2004 | Reade et al. |
| 2005/0134461 A1 * | 6/2005 | Gelbman et al. ......... 340/572.8 |
| 2006/0175400 A1 * | 8/2006 | Sweeney et al. ............ 235/383 |
| 2006/0187040 A1 * | 8/2006 | Sweeney ................. 340/572.1 |

FOREIGN PATENT DOCUMENTS

| | | |
|---|---|---|
| EP | 0 568 067 A1 | 11/1993 |
| WO | WO 93/16443 A1 | 8/1993 |
| WO | WO 03/016803 A1 | 2/2003 |

* cited by examiner

DISPLAY MANAGEMENT SYSTEM

BACKGROUND

The present invention relates to a display management system.

SUMMARY

In accordance with exemplary embodiments, a system and method to present personalized information based on an identification of a customer and/or a product is provided. Preferably, the system operates by acquiring identification information of a customer and/or a product, using this acquired identification information to determine personalized information and providing the personalized information to a display screen of the system for viewing by the customer.

Also preferably, the system provides the personalized information to a display wirelessly, wherein the display is also powered wirelessly.

Additionally, the system preferably provides an identification card that can be read wirelessly for the identification information of a customer.

In another embodiment, a display system, comprising a wireless display; and an electromagnetic field producing information reader, wherein the wireless display is powered exclusively by an electromagnetic field produced by the information reader is provided.

In another embodiment, a method of displaying personalized information, comprising providing an electromagnetic radiation field; reading an identification card or tag to obtain identification information using the electromagnetic radiation field; accessing identification information corresponding to the identification information; processing personalized information based on the information gathered; transmitting the personalized information via the electromagnetic radiation field to a wireless display; wirelessly powering the wireless display using the electromagnetic radiation field; and displaying the personalized information on the wireless display, wherein the wireless display is powered exclusively by the electromagnetic radiation field is provided.

BRIEF DESCRIPTION OF THE DRAWING FIGURES

FIG. 1 illustrates a side perspective view portion of an exemplary display management system.

DETAILED DESCRIPTION

A system and method to present personalized information based on an identification of a customer and/or a product is provided, wherein the system operates by: (A) acquiring identification information of a customer and/or a product; (B) using this acquired identification information to determine personalized information; (C) providing the personalized information to a display screen; and (D) displaying the personalized information on the display screen of the system for viewing by the customer, wherein each of these operating steps is discussed below.

I. System Operation

A. Identification of a Customer and/or a Product

Identification of a customer and/or product is preferably provided by capturing an individual identification without customer interaction. Specifically, each customer can be provided with a card or each product can be provided with a tag, wherein the card or tag contains a mechanism which can be read wirelessly. The mechanism can be a radio frequency identification (RFID) tag.

In a preferred embodiment, RFID technology uses radio waves to automatically identify people or products. The RFID system includes a RFID tag which can include a memory chip attached to an antenna, and a RFID reader separate from the RFID tag which is used to read information from the RFID tag.

In general, the memory chip in the RFID tag is used to store a serial number, such as an EPC (electronic product code) or other information. An EPC is a product identification similar to the UPC (Universal Product Code) or barcode. Like the bar code, the EPC can be divided into numbers that identify a customer or product using a specific number for different manufacturers, products, versions or serial numbers. This EPC is embedded in a memory chip (smart tag) on individual products or cards, wherein each smart tag can be scanned by a wireless "reader," which transmits the product's embedded identity code to the Internet, intranet or other connections to where the "real" information on the product is transmitted from one location to another. That information can then be communicated to provide whatever information is needed about that product.

In the preferred embodiment, the "readers" or EPC readers use radio waves to "communicate" with RFID tags and gather EPCs. Through communication between the RFID tags and the EPC readers, a customer or product can be identified, wherein the EPC reader transmits one or more radio frequencies which can be modulated by the RFID tags, then the EPC reader receives the one or more modulated radio frequencies, wherein the received one or more modulated radio frequencies can be used to "read" an RFID tag and identify the customer or product.

RFID tags and EPC readers can be tuned to the same radio frequency in order to communicate with one another; however, multiple frequencies are available for RFID systems. Generally there are high frequencies ("HF," around 13.56 MHz), ultra-high frequencies ("UHF," around 850-950 MHz) and microwave frequencies (around 2.45 and 5.8 GHz) used with RFID systems. Additionally, there are near-field inductive communication frequencies (around 125 KHz) for use with wireless credit cards and the like. Thus, there are many options (near-field inductive or E-field capacitive and EM far-field coupling at several frequencies) for providing wireless power other than the power used for a main communications channel to a tag.

HF tags, UHF tags, combinations of HF and UHF tags and transceivers are used in a preferred system, where multiple RF power sources can be used simultaneously as desired, as discussed below, and multiple transceivers can be used for different ranges as discussed in U.S. Pat. No. 6,726,099, which is herein incorporated by reference in its entirety.

The wireless read fields, such as RF fields, can be either magnetic fields or electrical fields depending upon the type of RFID tags to be read. For inductively coupled RFID tags, the wireless read fields are magnetic fields, wherein the RFID tag receives the magnetic energy of the magnetic field and modulates the magnetic field. Next, the wireless information reader, such as an EPC reader, reads the modulated magnetic field to identify the RFID tag and the system correlates the identification of the RFID tag with a customer and/or product based upon previously stored information. Capacitively coupled RFID tags operate in a manner similar to the inductive coupled RFID tags except that the RFID tag modulates an electric field, and the modulated electric field is used to identify the RFID tag.

With respect to a wireless read field, situations may occur where there are more than one RFID tag is present in this field. However, it is desirable that the RFID and personalized information are based on at most one RFID tag corresponding to one customer and one RFID tag corresponding to one product, where each is most proximate to the system. To address these situations, exemplary embodiments employ logic which can detect the proximity of the read RFID tags. Specifically, based upon the strength of the signal read from the RFID tags, the system can determine that the strongest signal corresponds to the RFID tag(s) most proximate to the system.

Additionally, the system can employ a signal strength threshold to control how close an RFID tag must be before it is read and personalized information is displayed. For example, based upon routine testing it can be determined that a predetermined signal strength corresponds to a predetermined distance from a wireless information reader and a display. This predetermined distance is selected to ensure that the personalized information displayed is provided only to the intended recipient of the information.

B. Using Acquired Identification Information to Determine Personalized Information Using the acquired identification information, or EPC, from the EPC reader and RFID tag, allows for other information to be gathered in reference to the EPC. Preferably, the EPC works together with a Physical Markup Language (PML) and an Object Naming Service (ONS). PML is a new standard "language" for describing physical objects to the Internet in the same way that HyperText Markup Language (HTML) is the common language on which most Internet web sites are based. The ONS tells computer systems where to find information about any object that carries an EPC code, or smart tag. ONS is based in part on the Internet's existing Domain Name System (DNS), which routes information to appropriate web sites. The ONS will likely be many times larger than the DNS, serving as a lightening fast "post office" that locates data for every single one of trillions of objects carrying an EPC code.

The Physical Markup Language enables linking physical objects to each other, people and information through the Internet using Electronic tags, EPC, PML and ONS. Electronic tags refer to a family of technologies that transfer data wirelessly between tagged objects and electronic readers. Radio Frequency Identification (RFID) tags often have small radio antennas, which transmit data over a short distance.

The EPC was conceived as a means to identify physical objects. The EPC code was created to enumerate all objects and to accommodate current and future naming methods. The EPC code was intended to be universally and globally accepted as a means to link physical objects to the computer network, and to serve as an efficient information reference. The Object Naming Service (ONS) links the Electronic Product Code (EPC) with its associated data file. More specifically, the ONS is an automated networking service, which, when given an EPC number, returns a host address on which the corresponding data file is located. The ONS is based on the standard Domain Naming Service (DNS).

Finally, the Physical Markup Language (PML) can be used for describing and classifying objects in a PML file, where the information is thus kept away from the object label.

Therefore, a processor can connect to the Internet to communicate with the ONS, wherein the ONS can find a link corresponding to the EPC and transmit this link back to the processor, wherein the processor can follow the link and gather information in PML, which in turn can be sent back to the EPC reader.

Also, in accordance with exemplary embodiments, a web service can also be associated with the system, where a Bamboo/SQL (Structured Query Language) service (such as produced by ThingMagic), an Apache web server or other lightweight web service engine can be used to provide data to the system. Access to information from the Internet can be provided by a TCP/IP (Transmission Control Protocol/Internet Protocol) protocol stack with an authentication cryptographic component in a conventional manner.

C. Providing the Personalized Information to a Display Screen of the System for Viewing by the Customer The EPC reader can provide personalized information to the display screen through transmitting data of the personalized information through the electromagnetic radiation field, as mentioned above. The data for display can be transmitted using various formats, such as ASCII text, HTML, XML, mobile code, such as Java, bitmaps or compressed bitmap structures such as simple run length encoding or JPEG encoding. Data for the system can be transferred using conventional XML constructs such as those in the EPC PML standard, as mentioned above, and others. The data can also be encrypted and the components can be verified for communication via passwords or other authentication methods.

D. Displaying the Personalized Information on the Display Screen

Preferably, personalized information data and power to drive the display screen are both provided by an EPC reader exclusively. By providing both the data and power by the EPC reader, wires and other types of infrastructure for the display screen would not be required, wherein the personalized information data can be preferably be provided by a radio frequency source while the power to drive the display screen can be any radiative power source, such as a low frequency capacitive field (i.e., 60 Hz).

Also preferably, the EPC reader can be used to communicate with the RFID tag and the internet using ONS and PML, as well as to transmit information and power to the display screen. By using the EPC reader extensively, the display screen does not require a separate controller, but rather can be controlled by the EPC reader.

In turn, as a separate power source is not needed for a separate controller for the display screen, the display screen can be made without a wired power connection or battery that would otherwise be used to power the controller. Thus, power to drive the display screen can be much lower, and preferably can be provided by an electromagnetic radiation field, such as any type of signal power, from an EPC reader alone. For example, the power to drive the display screen can be provided by any radiative power source from any type of signal power, such as low frequency like 60 Hz signals, wherein the coupling of the power can be by induction or capacitance coupling, as well as RF power coupling. Preferably any type of alternating current can be utilized.

By providing a low power display screen, the display screen can be wireless and therefore can allow for easier and simpler installation of the display screen. One commercially available low power display screen is produced by E Ink Corporation of Cambridge, Mass.

E. EXAMPLES

As illustrated in FIG. 1, a system 100 is provided for acquiring identification information of a customer and/or a product, then personalizing information based on the identification information for display on a display screen 110. This is accomplished by providing a system 100 in communication with a wireless information reader, such as an EPC reader 130, and a display screen 110.

The system operates by having the EPC antenna 140 project multiple electromagnetic fields, such as a RF field 150 and a capacitive field (not shown), wherein the display screen 110 is placed within the fields. By placing the display screen 110 within the fields, the display screen 110 can receive data corresponding to the personalized information from the RF field 150 and power from the capacitive field wirelessly.

A wireless information reader, such as the EPC reader 130, uses radio waves transmitted by an antenna, such as an EPC antenna 140 as illustrated in FIG. 1. The radio waves can be in the form of an electromagnetic field, such as a RF field 150, which as illustrated in FIG. 1, can be provided in front of a display screen 110, to communicate with RFID tags to acquire EPCs.

The EPC reader 130 can be used to attain EPCs from RFID tags read in the RF field 150. With the EPCs from the RFID tags, PML information or personalized information can be acquired through an ONS by the EPC reader 130, wherein the EPC reader 130 can transmit data to the display screen 110 wirelessly in various formats, including mobile code, such as Java.

Additionally, sources of external data can be used with the system mentioned above. For example, alternative and/or additional data can also be provided by a touchpad array or other data input connection, such as a serial non-volatile random access memory (NVRAM). Limited local navigation and interaction or more extensive reader/host-based navigation can be provided by the touchpad array or via other low power consumption interactive devices, such as a resistive touchscreen such as those made by ELO TouchSystems, Inc. of Fremont, Calif. and others. A Serial NVRAM can be used to store display data corresponding to RFID tag data. Non-volatile memory, which holds the data in the NVRAM, holds data securely even without power, thus by using NVRAM, a separate power source for the memory is not required. Flash memory is preferably used, however any type of non-volatile memory, such as FRAM, may also be used as a data input.

II. Wireless Displays

In exemplary embodiments, as mentioned above, low power display screens can be used in the system. By using low power displays, the display screens can be made wireless and can be made without an attached power source, such as a battery or AC/DC power source. By making the display screen low power and wireless, the display screens can be provided as a low cost addition to a preexisting system, as the display screens can be simpler and more maneuverable with less infrastructure or pre-engineering of the system to support the displays.

Preferably, the display screens are low power display screens which can be powered by an existing wireless information reader simply by mounting the display screen in the read field. Examples of low power displays, such as electro-phoretic displays, can be found in U.S. Pat. No. 6,118,426, assigned to E Ink Corporation and commonly-assigned U.S. Patent Application No. 2003/0233288, which are herein incorporated by reference in their entireties. Alternatively, other low power display screens can be used, such as cholesteric or polymer-dispersed liquid crystal displays, or electrochromic or other electromechanical displays.

Preferably, the low power display screens can vary from simple segmented alphanumeric to monochromatic/grayscale to full color graphics without a wired source of data or power.

As mentioned above, the system preferably provides personalized information and power to the display screen wirelessly. As illustrated in FIG. 1, the display screen 110 is provided with the information and power by locating the display screen 110 within a RF field 150 providing the information and a power supplying field, which can provide power for the display screen through induction or capacitance coupling. As the display screen 110 is within the RF field 150 and a power supplying field, radio frequency signals and power envelop the display screen 110. The RF field 150 can be used to transmit both data and power, albeit low levels of power, or a separate power supplying field can be provided from the EPC reader 130 to the display screen 110. Thus, simply by placing the display screen 110 within the RF field 150 and the separate power supplying field, if provided, the EPC can supply all of the data and all of the power required to display personalized information on a display screen.

A related low power display is described in U.S. Pat. No. 6,118,426, as mentioned above, as an encapsulated, electrophoretic radio-controlled display system, however, other low power display screens can also be used. In the system of U.S. Pat. No. 6,118,426, a radio-controlled display forms a radio sign that can be updated using information sent via RF energy, wherein the sign includes a surface covered with a display material and control circuitry. The control circuitry is used in the system to receive broadcast RF energy, decode the information and update the sign with that information. As the control circuitry is used in the display for receiving, decoding and updating, a power supply, such as batteries, or a hard-wired source of power is needed for the control circuitry in the display.

However, unlike embodiments of the display screen and the system as disclosed herein, the display of U.S. Pat. No. 6,118,426 requires a controller and an external power source, wherein the controller is used to decode radio signals received by the antenna and update the display based on the information received by the antenna. Because the controller is used, an external source of power is needed and is provided as part of the display, thus the display of U.S. Pat. No. 6,118,426 is wired to the external source of power and requires a wiring infrastructure.

On the other hand, in exemplary display screens and systems provided herein, control of the display screen can be provided by a wireless information reader, such as an EPC reader. By providing control functionality in a wireless information reader, exemplary embodiment display screens can be lighter and powered by a read field without requiring a wired external source.

It is noted that other power system components may be used to power the display screen along with the electromagnetic radiation power to replace, supplement or charge display power sources. For example, power sources, such as secondary cells, super-capacitors or other energy storage media can be provided. However, exemplary embodiment display screens can be powered by the wireless information readers alone without other power system components. Charge control circuitry, such as coulomb integrators, can also be used to maximize life and charge accumulation of electrochemical storage means. Simple cell voltage monitoring can also be provided in order to provide charge control for cells having a relationship between voltage and charge states.

Additionally, multiple electromagnetic radiation power sources can be used simultaneously to provide power to the system. Any type of signal power can be used for providing power to system using induction or capacitance coupling. For example, radiative power sources, such as alternating current can be used. One example would include a capacitive field at 60 Hz.

Another example would include RF power sources, such as high frequency (HF) radiation with a frequency of 13.56 MHz and ultra high frequency (UHF) radiation with a frequency of 900 MHz, which can be supplied by one or more EPC readers. By using the two radio frequencies, one can be used to search for and read RFID tags, while the other can be used to provide power to a display. Thus, one frequency can be dedicated to supplying only power to a display screen if desired. For example, as EPC readers are used to search for RFID tags, the UHF frequency can provide a data channel for modulation by the RFID tags found, while the HF frequency can provide a data channel that is not used for modulation, but rather is used to power the display. Alternatively, a single radio frequency can be provided for both functions with or without an additional power source radiative power source, or more than two frequencies can be provided to increase the data channels and/or power to the display. Also, multiple antennas and demodulation circuits can be provided to simultaneously acquire power from different wavelengths and coupling modes.

Additional logic can also be provided to turn off the control circuitry of a display screen when the display screen is not being addressed, thereby conserving energy and maximizing power harvesting for storage. Information on energy accumulation can be transmitted to logic in the control circuitry of the display screen to allow for remote management of the display screen and/or maintenance requests.

Communications to and from a RFID tag preferably conform to the EPCglobal Class 3 active tag standard when available, but other formats of wireless data transfer could be used, such as those of the ISO-18000 series of standards.

Additionally, on-display functions can be provided and powered, such as graphics, sound generators, light emitters, scent emitters, sensors or mechanical motion actuators. Also, a device can be provided to allow presence detection by the RFID reader if the display controller has insufficient power to respond or is damaged.

Examples of the uses of the system include but are not limited to displaying information regarding products, time of day, weather, sales, specials, freshness checks, expiration and recall notices, promotional information, or display screens of art or graphics.

III. EXAMPLES

In an exemplary embodiment, a low-cost, thin, personal promotion display screen is provided. Because of its low cost and thinness, the display can be easily added to an RFID based system without the use of additional wiring, wherein both the power to run the display screen and the information to be displayed can be provided wirelessly from a RFID system.

In an exemplary embodiment, a wireless promotion system, as described in a commonly-assigned application 11/049,871, entitled "Wireless Identification Based Display", filed on an even date herewith which is herein incorporated by reference in its entirety, can be used in conjunction with a low power display. In the commonly-assigned application, a message is provided to a customer in a discreet manner, wherein the display screen can incorporate directional viewing properties such as those typically found in liquid crystal displays (LCDs) and wherein the data is transferred to a LCD from a system that could be used herein. Additionally, the LCD can be powered by a power supply system. By using a low power display, a power supply and power supply system would not be required to power the display, but rather RF fields could be used to power the display.

In another exemplary embodiment, as illustrated in FIG. 7, a wireless information reader, such as an EPC reader, can be used with a power coupling system as discussed in commonly-assigned U.S. Patent Publication No. 2003-0233288A1, which is herein incorporated by reference in its entirety. As discussed in commonly-assigned U.S. Patent Publication No. 2003-0233288A1, a power distribution device can be positioned to at least partially support packages, wherein the wireless information reader can be powered by the power distribution device through a support in the power coupling system.

In another embodiment, a visibility monitoring system can be used in conjunction with a low power display system provided herein. As discussed in commonly-assigned U.S. Patent Publication No. 2003-0227384A1, which is herein incorporated by reference in its entirety, a visibility monitoring system with a presence and viewability verification is provided. By incorporating the visibility monitoring with an exemplary low power display system, the exemplary low power display system can be provided with power conservation and/or viewability verification can be provided for the system provider.

Although the present invention has been described above in connection with particular exemplary embodiments, the present invention can include other variations. For example, in addition to, or as an alternative to, the use of a display, an audible message can be provided to the consumer.

As described above, the type of message provided is based on the identification of a customer and/or a product. Accordingly, the system may be provided to the retail establishment by a particular company. The particular company can then display messages intended to direct the customer towards the particular company's products. For example, if it is determined that the customer is about to purchase a product from a competitor, the message can inform the customer that a discount will be provided if the customer purchases a similar product from the particular company.

In another exemplary embodiment, a cigarette kiosk can be supplied with an exemplary wireless display system, wherein a display screen can be added to a kiosk wirelessly and can be used to display personalized information to a customer. For example, a customer can have a card containing a RFID tag. The card can then be read by an EPC reader of the system when the card enters a RF field produced by the EPC reader. Next, the EPC reader can gather personalized information based on an EPC read from the RFID tag by the EPC reader.

After the personalized information is gathered by the EPC reader, the EPC reader can then transmit power and data to the display screen. Thus, with the display screen located in the RF field, the display screen can display the personalized information data using the data and power from the EPC reader.

In another embodiment, a wireless display system and a product shelf can be provided for use in displaying pricing or other relevant information regarding a product. For example, a wireless display system as discussed above can be used in conjunction with an automatic price display control, as discussed in commonly-assigned PCT/US2003/016803, which is herein incorporated by reference in its entirety. As discussed in PCT/US2003/016803, an electronic price display system can be provided with an electronic price display unit, wherein the display can be wireless using a low power display and an EPC reader for reading a RFID tag on a product.

The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A display system, comprising:
a wireless display;
an electromagnetic field producing information reader, wherein the wireless display is powered by an electromagnetic field produced by the information reader, and wherein the electromagnetic field includes a plurality of frequency fields, such that a first frequency field provides at least data to the wireless display and a second frequency field provides at least power to the wireless display.

2. The system of claim 1, wherein the plurality of frequencies of the electromagnetic field includes at least one of a radio frequency field, a high frequency field and an ultra high frequency field.

3. The system of claim 2, wherein the electromagnetic field is a high frequency field and an ultra high frequency, and wherein the high frequency field provides power to the wireless display and the ultra high frequency field provides power and data to the wireless display.

4. The system of claim 2,
wherein the electromagnetic field is a radio frequency field, and
wherein the radio frequency field comprises a magnetic field which reads inductively coupled radio frequency identification (REID) tags, wherein the RFID tags receive magnetic energy from the magnetic field and modulate the magnetic field, and wherein the modulation of the magnetic field is used to identify individual RFID tags; or
wherein the radio frequency field comprises an electric field which reads capacitively coupled RFID tags, wherein the RFID tags receive electric energy from the electric field and modulate the electric field and wherein the modulation of the electric field is used to identify individual REID tags.

5. The system of claim 1,
wherein the information reader comprises an electronic product code (EPC) reader,
wherein the EPC reader gathers EPC data through the electromagnetic field;
wherein the EPC reader reads radio frequency identification (REID) tags or smart cards; and/or
wherein the EPC reader includes an antenna, which receives EPC information from REID tags or smart cards and transmits display information to the wireless display.

6. The system of claim 5, further comprising a processor, wherein the EPC reader is in communication with the processor.

7. The system of claim 5, wherein the EPC information corresponds to an RFID tag or a smart card and comprises an electronic product code stored in a microchip in the RFID tag or the smart card and the display information comprises external data gathered by the processor corresponding to the electronic product code.

8. The system of claim 5, wherein the EPC reader transmits display information to the wireless display through a radio frequency field.

9. The system of claim 1,
wherein the information reader transmits personalized information through the electromagnetic radiation field to the wireless display; and/or
wherein the information reader controls the wireless display.

10. The system of claim 1, wherein the wireless display comprises a low power display screen, an electrophoretic display screen and/or a liquid crystal display (LCD).

11. The system of claim 1, wherein the wireless display comprises a liquid crystal display (LCD), and wherein the LCD comprises a cholesteric or polymer-dispersed LCD.

12. The system of claim 1, wherein the wireless display comprises a low power display, and wherein the low power display comprises an electro-chromic or electromechanical display screen.

13. The system of claim 1,
wherein display information is supplied to the wireless display through the electromagnetic field;
wherein display information is gathered by the information reader through a processor and transmitted through the electromagnetic field by the information reader in a format compatible with the wireless display;
wherein display information and power to run the wireless display are supplied to the wireless display through the electromagnetic field alone; and/or
wherein the wireless display is not physically connected to a power supply.

14. The system of claim 1, further comprising a card controller, wherein information on the card controller is read by the information reader, and wherein the card controller optionally comprises a smart card, and wherein the smart card optionally comprises a RFID tag.

15. The system of claim 1, further comprising:
an output for providing audio based on information received by the information reader, and wherein the output optionally comprises a speaker in communication with the information reader;
a power coupling system, wherein the information reader is powered by the power coupling system, wherein the power coupling system optionally comprises electrodes in contact with the system, wherein the electrodes are optionally hard wired to a power source; and/or
one or more of the following on-display functions: sound generator, light emitter, scent emitter, sensor or mechanical motion actuator, wherein the on-display functions cooperate with the wireless display to visually or acoustically display data from the information reader or to mechanically or electronically gather data for the system.

16. The system of claim 1, wherein the system comprises a cigarette sales promotion system, a consumer buying pattern recognition system, a game of chance system, and/or an electronic price display system.

17. The system of claim 1, wherein the information reader receives wireless information identifying a customer, wherein the wireless information is optionally provided by a smart card, wherein the information reader optionally reads an electronic product code from a microchip in the smart card, optionally transmits the electronic product code through a processor to the internet or an intranet and optionally receives display information through the processor corresponding to the smart card.

18. The system of claim 1, wherein the information reader receives display information identifying a product, wherein the display information is optionally provided by a RFID tag, wherein the information reader optionally reads an electronic product code from a microchip in the RFID tag, optionally transmits the electronic product code through a processor to the internet or an intranet and optionally receives information through the processor corresponding to the RFID tag.

19. The system of claim 18, wherein the product is a cigarette package or carton of cigarette packages.

20. A method of displaying personalized information, comprising:
  providing an electromagnetic radiation field;
  reading an identification card or tag to obtain identification information using the electromagnetic radiation field;
  accessing and processing personalized information corresponding to the identification information read;
  transmitting the personalized information via the electromagnetic radiation field to a wireless display at a first frequency;
  wirelessly powering the wireless display at a second frequency of the electromagnetic radiation field; and
  displaying the personalized information on the wireless display, wherein the wireless display is powered exclusively by the electromagnetic radiation field.

* * * * *